United States Patent
Huang

(10) Patent No.: US 9,077,898 B2
(45) Date of Patent: Jul. 7, 2015

(54) SMART WEBCAM DEVICE IN DISTRIBUTED CIRCUIT CASINGS AND CABLE-ENCAPSULATING NECK STRUCTURE

(71) Applicant: Jeffrey Huang, San Jose, CA (US)

(72) Inventor: Jeffrey Huang, San Jose, CA (US)

(*) Notice: Subject to any disclaimer, the term of this patent is extended or adjusted under 35 U.S.C. 154(b) by 170 days.

(21) Appl. No.: 13/941,476

(22) Filed: Jul. 13, 2013

(65) Prior Publication Data

US 2015/0015723 A1 Jan. 15, 2015

(51) Int. Cl.
*H04N 5/225* (2006.01)
*H04N 5/232* (2006.01)

(52) U.S. Cl.
CPC ......... *H04N 5/23222* (2013.01); *H04N 5/2252* (2013.01)

(58) Field of Classification Search
CPC ............ H04N 5/23222; H04N 5/2472; H04N 5/2253; G03B 17/56
USPC ........................ 348/373, 207.1; 396/428, 424
See application file for complete search history.

(56) References Cited

U.S. PATENT DOCUMENTS

| | | | |
|---|---|---|---|
| 2007/0003274 A1* | 1/2007 | Sukenari | 396/428 |
| 2007/0297788 A1* | 12/2007 | Wahl et al. | 396/419 |
| 2010/0084529 A1* | 4/2010 | Depay et al. | 248/229.22 |
| 2010/0302436 A1* | 12/2010 | Gasnier et al. | 348/373 |
| 2011/0285900 A1* | 11/2011 | Chang et al. | 348/374 |

* cited by examiner

*Primary Examiner* — Mekonnen Dagnew
(74) *Attorney, Agent, or Firm* — Invent Capture, LLC.; Samuel S. Cho

(57) ABSTRACT

Various embodiments of a novel smart webcam device in distributed circuit casings and cable-encapsulating neck structure are disclosed. In one embodiment, the novel smart webcam device has a bottom housing that contains a network communication-capable computing circuitry, a top housing that contains a webcam-specific circuitry (e.g. a camera lens and a camera processing unit), and a cable-encapsulating neck structure interposed between the bottom housing and the top housing that uniquely encapsulates a data communication and power cable, which connects a camera data interface in the bottom housing and a webcam unit interface in the top housing. Preferably, the top housing and the bottom housing are swivel-capable around the cable-encapsulating neck structure. The novel smart webcam device is internally capable of transforming raw multimedia data captured from the webcam-specific circuitry into processed multimedia data in standardized formats, and can also transmit the processed multimedia data over a data network.

20 Claims, 4 Drawing Sheets ribution. Moreover, it may also be beneficial to provide a novel webcam device that has a cable-encapsulating neck structure situated between the webcam-specific circuitry and the network communication-capable computing circuitry for operational durability in various positioning of the novel webcam device.

SMART WEBCAM DEVICE IN DISTRIBUTED CIRCUIT CASINGS AND CABLE-ENCAPSULATING NECK STRUCTURE

BACKGROUND OF THE INVENTION

The present invention generally relates to portable electronic devices. More specifically, the invention relates to one or more smart webcam devices in distributed circuit casings and cable-encapsulating neck structures. Furthermore, the invention also relates to a novel casing structure suitable for a multi-purpose usage of a smart webcam device. In addition, the invention also relates to a multi-segment casing structure that is appropriately weight-balanced for multi-purpose usage and operational durability.

Conventional "webcam" devices are typically computer-mounted or display-mounted electronic devices, each with a camera lens to capture one or more images, videos, and/or other multimedia content visible and recordable through the camera lens. With various video capturing and multimedia applications becoming ubiquitous and popular, many personal computers (PC's), portable electronic devices, and building structures, and vehicles are being mounted with "webcams," each of which is configured to communicate with a main body of a computer or another main computing unit that contains a central processing unit (CPU), a memory unit, a graphics processor, and/or an input/output (I/O) communication interface. Furthermore, webcam devices are generally configured to communicate with another electronic device over a data network, so that multimedia information captured in real-time can be stored, viewed, or edited by various application programs executed on the other electronic device connected over the data network.

In some devices, a webcam is structurally embedded to a body of another electronic device. For example, many of today's laptop computers each embed a front-facing webcam on a top portion of its display screen frame. Furthermore, many of today's cellular phones each embed a rear-facing camera lens, and sometimes also embed a front-facing camera lens. Both of these camera lenses in cellular phones can be considered "webcams" because they can be used in conjunction with networked devices and Internet-enabled communications applications, such as Skype.

However, there are numerous electronic devices that still do not embed webcams despite the convenience of integrating them. For example, many big-screen television frames in today's market still do not embed webcams. Likewise, many larger computer display models still do not incorporate webcams. Furthermore, vehicles that can benefit from incorporation of webcams for evidence-gathering purposes (i.e. in case of accidents or illegal activities) still do not feature windshield-facing video-recording equipment as standard features.

Even though a user can manually attach a webcam to a big-screen television, to a large computer display screen frame, or to an interior of a vehicle, most of these webcam devices still need to be connected to a separate computing equipment for recording of data or data communication. Moreover, a conventional webcam-integrating portable electronic device that provides both webcam recording and network communication functions is typically a single-piece "slab" casing device, which requires a separate mount to be mounted on top of a television frame, a computer display screen, or a vehicle dashboard. Equally important, a conventional "slab" casing webcam equipment does not stand on its own on a flat ground, and cannot be adjusted to a stable position, unless a dedicated mounting unit is utilized.

Therefore, it may be beneficial to provide a novel webcam device casing with balanced weights in multiple segments. Furthermore, it may also be beneficial to provide a novel webcam device casing that contains both webcam-specific circuitry and network communication-capable computing circuitry in different segments of the novel webcam device for ideal weight distribution. Moreover, it may also be beneficial to provide a novel webcam device that has a cable-encapsulating neck structure situated between the webcam-specific circuitry and the network communication-capable computing circuitry for operational durability in various positioning of the novel webcam device.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a smart webcam device in distributed circuit casings is disclosed. This smart webcam device comprises: a swivel-capable bottom housing that includes a network communication-capable computing circuitry, wherein the network communication-capable computing circuitry comprises a CPU, a memory unit, a camera data interface, and an external data communication interface; a swivel-capable top housing that includes a webcam-specific circuitry, wherein the webcam-specific circuitry comprises a camera lens, a camera processing unit, and a webcam unit interface; and a cable-encapsulating neck structure interposed between the swivel-capable bottom housing and the swivel-capable top housing, wherein the cable-encapsulating neck structure encapsulates a data communication and power cable that connects the camera data interface of the swivel-capable bottom housing and the webcam unit interface of the swivel-capable top housing, and wherein the cable-encapsulating neck structure also includes a webcam hanger that protrudes from an edge of the cable-encapsulating neck structure.

In another embodiment of the invention, another smart webcam device in distributed circuit casings is disclosed. This smart webcam device comprises: a swivel-capable first housing that includes a network communication-capable computing circuitry, wherein the network communication-capable computing circuitry comprises a CPU, a memory unit, a camera data interface, and an external data communication interface; a swivel-capable second housing that includes a webcam-specific circuitry, wherein the webcam-specific circuitry comprises a camera lens, a camera processing unit, and a webcam unit interface; and a cable-encapsulating neck structure interposed between the swivel-capable first housing and the swivel-capable second housing, wherein the cable-encapsulating neck structure encapsulates a data communication and power cable that connects the camera data interface of the swivel-capable first housing and the webcam unit interface of the swivel-capable second housing, and wherein the cable-encapsulating neck structure also includes a webcam hanger that protrudes from an edge of the cable-encapsulating neck structure.

DETAILED DESCRIPTION

Figure 1:
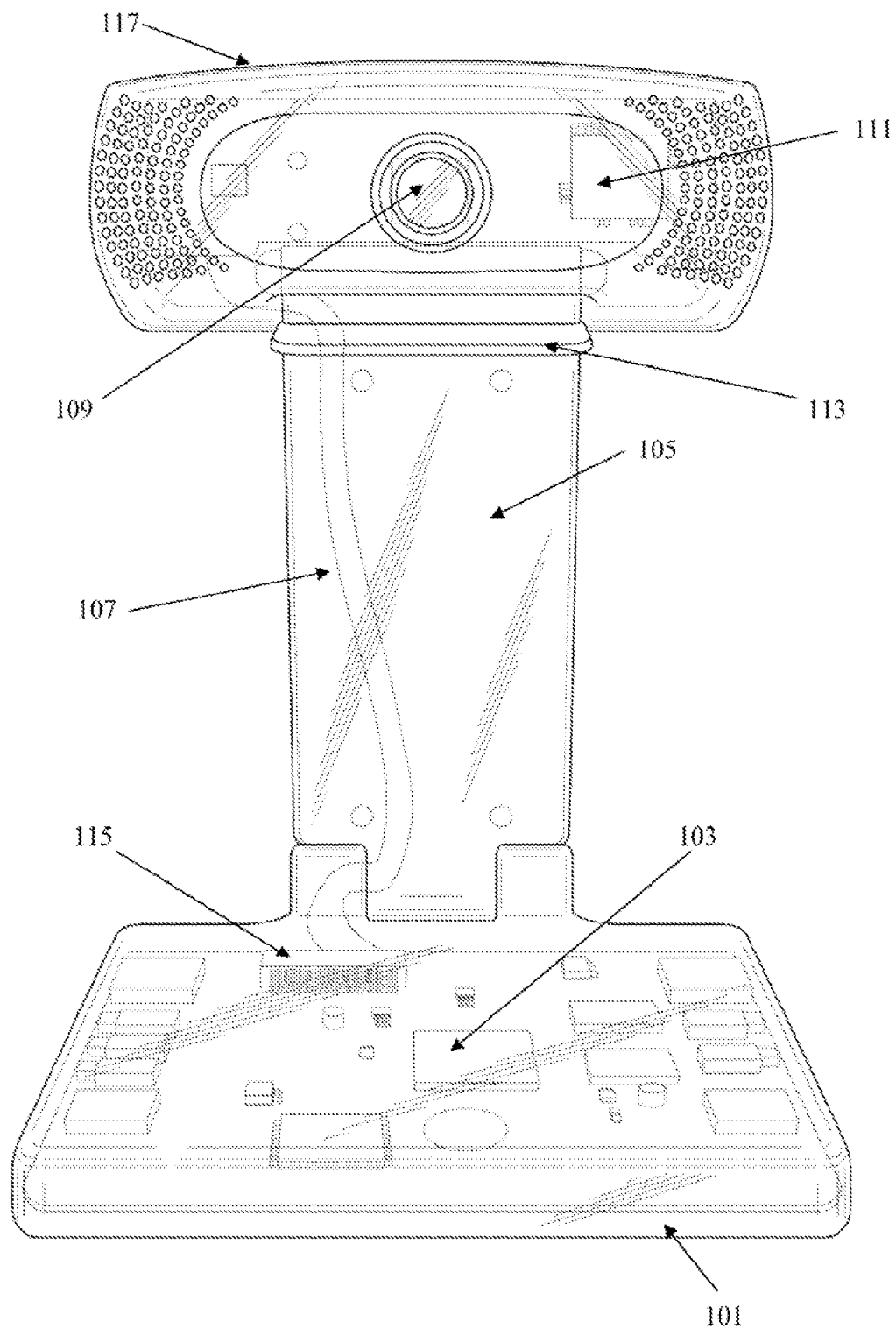
FIG. 1 shows a frontal perspective diagram of a smart webcam device with distributed circuit casings and cable-encapsulating neck structure, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of procedures, logic blocks, processing, and/or other symbolic representations that directly or indirectly resemble one or more smart webcam devices in distributed circuit casings and cable-encapsulating neck structures. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "webcam" is defined as an electronic device with a camera lens that can capture pictures, videos, and/or other multimedia information through the camera lens. Typically, a webcam is connected to a computing unit, such as a PC, a laptop computer, a cellular phone, or another electronic device, that can process and store the captured pictures, videos, and/or other multimedia information in standardized multimedia formats. Furthermore, the webcam is typically utilized to transmit either raw streams or processed and formatted streams of captured pictures, videos, and/or other multimedia information to a remotely-connected computer server or another networked electronic device via a data network, such as the Internet.

In addition, for the purpose of describing the invention, a term "cloud," "cloud network," or "cloud computing" is defined as a data network environment in which data from an electronic system operatively connected to the data network environment is typically stored in a network-attached storage, instead of being solely stored in a local storage of the electronic system as long as the data network is available for data communication. In one example, the data from the electronic system may be stored in both the local storage of the electronic system as well as the network-attached storage by default. In another example, the data from the electronic system may only be stored in the network-attached storage by default without storing any data permanently in the local storage of the electronic system, other than utilizing a temporary local buffer of the electronic system.

Moreover, for the purpose of describing the invention, an "electronic system," a "computing unit," and/or a "main computing unit" are defined as electronic-circuit hardware devices such as a computer system, a computer server, a handheld device (e.g. a cellular phone, a camera, a camcorder, and etc.), an integrated webcam system, or another electronic-circuit hardware device.

Furthermore, for the purpose of describing the invention, a term "smart webcam device" is defined as a novel webcam device that integrates camera lens-based capturing of multimedia information (i.e. pictures, videos, and etc.), internal processing of multimedia information within the novel webcam device, and cloud network communication capability to transmit the internally-processed multimedia information to another electronic device via a cloud network. In a preferred embodiment of the invention, a smart webcam device is also configured to function as an Internet modem and a general-purpose cloud network-connected computing device for web browsing, if a separate display screen or a television screen is connected to the smart webcam device.

In addition, for the purpose of describing the invention, a term "webcam-specific circuitry" is defined as one or more groups of electronic circuits that are located inside a discrete casing that also houses a camera lens as part of a webcam unit. Examples of webcam-specific circuitry include, but are not limited to, a camera processing unit, a camera lens, and/or a data input/output (I/O) port inside the discrete casing that houses the camera lens for the webcam unit.

Moreover, for the purpose of describing the invention, a term "network communication-capable computing circuitry" is defined as one or more groups of electronic circuits that are configured to transmit a plurality of multimedia data packets to another electronic device via a data communication network, such as a local area network (LAN), a cloud network, and/or the Internet. For example, in a preferred embodiment of the invention, the network communication-capable computing circuitry can be housed in a bottom housing of a smart webcam device in distributed circuit casings, with a cable-encapsulating neck structure positioned between the bottom housing and a top housing, which contains the webcam-specific circuitry. Furthermore, in one embodiment of the invention, the network communication-capable computing circuitry is also capable of performing picture, video, and other multimedia information-processing functions to transform raw multimedia data captured from a smart webcam device's camera lens into processed multimedia data in standardized formats, such as Joint Photography Experts Group (JPEG) and Moving Pictures Experts Group (MPEG). In this embodiment of the invention, the processed multimedia data can then be transmitted to another electronic device via a data communication network. In an alternate embodiment of the invention, the processing of multimedia data may be performed at least partially or completely outside of the network communication-capable computing circuitry.

Furthermore, for the purpose of describing the invention, a term "cable-encapsulating neck structure" is defined as a mid-segment casing positioned between a first housing that contains a webcam-specific circuitry and a second housing that contains a network communication-capable computing circuitry, wherein the mid-segment casing encapsulates a data communication and/or power cable that connects a webcam unit interface of the first housing and a camera data interface of the second housing. In one example, the first housing is a swivel-capable top housing unit, and the second housing is a swivel-capable bottom housing unit, with the cable-encapsulating neck structure interposed between the bottom housing unit and the top housing unit. In another example, the first housing is a swivel-capable leftmost housing unit, and the second housing is a swivel-capable rightmost housing unit, with the cable-encapsulating neck structure interposed between the leftmost housing unit and the rightmost housing unit. Yet in another example, the first housing is a swivel-capable rightmost housing unit, and the second housing is a swivel-capable leftmost housing unit, with the cable-encapsulating neck structure interposed between the rightmost housing unit and the leftmost housing unit.

In general, one or more embodiments of the invention relate to a novel webcam device in distributed circuit casings and cable-encapsulating neck structure. Furthermore, one or more embodiments of the invention also relate to providing balanced weight distributions in multiple segments of the distributed circuit casings and cable-encapsulating neck structure for the novel webcam device. In addition, one or more embodiments of the invention also relate to providing a webcam-specific circuitry and a network communication-capable computing circuitry in different segments of the novel webcam device for versatility and multi-purpose application of the device. Moreover, one or more embodiments of the invention also relate to a cable-encapsulating neck structure situated between the webcam-specific circuitry and the network communication-capable computing circuitry for operational durability in various positioning of the novel webcam device.

One objective of an embodiment of the present invention is to provide a novel webcam device in distributed circuit casings and cable-encapsulating neck structure Yet another objective of an embodiment of the present invention is to provide balanced weight distributions in multiple segments of the distributed circuit casings and cable-encapsulating neck structure for the novel webcam device.

In addition, another objective of an embodiment of the present invention is to provide a webcam-specific circuitry and a network communication-capable computing circuitry in different segments of the novel webcam device for versatility and multi-purpose application of the device.

Furthermore, another objective of an embodiment of the present invention is to provide a cable-encapsulating neck structure situated between the webcam-specific circuitry and the network communication-capable computing circuitry for operational durability in various positioning of the novel webcam device.

FIG. 1 shows a frontal perspective diagram of a smart webcam device (100) with distributed circuit casings (101, 117) and a cable-encapsulating neck structure (105), in accordance with an embodiment of the invention. In a preferred embodiment of the invention, the smart webcam device (100) comprises a swivel-capable bottom housing (101) and a swivel-capable top housing (117) that form the distributed circuit casing (101, 117), plus the cable-encapsulating neck structure (105).

In the preferred embodiment of the invention, the swivel-capable bottom housing (101) contains a network communication-capable computing circuitry (103), which comprises a CPU, a memory unit, a camera data interface (115), and an external data communication interface. In addition, the swivel-capable bottom housing (101) may also contain a local data storage, a graphics unit (e.g. a graphics processor unit, a display driver, and etc.), and a power management unit. Preferably, the power management unit of the swivel-capable bottom housing (101) is operatively connected to a power source, such as a power outlet, a power adapter, and/or a battery unit. Furthermore, in the preferred embodiment of the invention, the swivel-capable top housing (117) contains a webcam-specific circuitry (111), which comprises a camera lens (109), a camera processing unit (e.g. 415 of FIG. 4), and/or a webcam unit interface (e.g. 301 of FIG. 3).

Moreover, as shown in one embodiment of the invention in FIG. 1, the cable-encapsulating neck structure (105) is interposed between the swivel-capable bottom housing (101) and the swivel-capable top housing (117). The cable-encapsulating neck structure (105) is designed to encapsulate a data communication and power cable (107) that connects the camera data interface (115) of the swivel-capable bottom housing (101) and the webcam unit interface (e.g. 301 of FIG. 3) of the swivel-capable top housing (117). In addition, the cable-encapsulating neck structure (105) also includes a webcam hanger (113) that protrudes from a frontal edge of the cable-encapsulating neck structure (105).

In the preferred embodiment of the invention, the distributed placement of the network communication-capable computing circuitry (103) in the bottom housing (101) and the webcam-specific circuitry (111) in the top housing (117) are spaced apart and separated by the cable-encapsulating neck structure (105) in the middle. As exemplified by the preferred embodiment of the invention shown in FIG. 1, the three-segment smart webcam device casings are structurally unique over conventional webcam casings and packages. For example, most conventional webcam casings and packages merely contain a webcam-specific circuitry with a camera lens in a "slab" single-piece casing, with a data communication and/or power cable (e.g. 107) externally exposed and freely hanging outside the slab single-piece casing. In conventional webcam casing designs, the freely-hanging data communication and/or power cable is typically exposed externally and is plugged into a computer or another electronic device that can perform multimedia data processing, network communications, and other computing functions. The external exposure of the freely-hanging data communication and/or power cable increases the chances of misconnections, faulty connections, and cable damages for potential malfunction of the webcam devices.

In contrast, the smart webcam device (100) in accordance with an embodiment of the present invention uniquely keeps the data communication and/or power cable (107) fully encased and encapsulated within the three segments (i.e. 101, 105, and 117) of the smart webcam device (100). In various real-life deployment conditions of the smart webcam device (100), the internal encapsulation of the data communication and/or power cable (107) in the cable-encapsulating neck structure (105) substantially improves the operational durability of the smart webcam device (100) by removing exposed cable-related clutter, and also by removing the need for an external cable connection to a main computing unit for multimedia data processing and transmission. Furthermore, the internal encapsulation of the data communication and/or power cable (107) in the cable-encapsulating neck structure (105) and the pivot-capable top and bottom housings (101, 117) enable versatile deployment and application of the smart webcam device (100) without requiring a dedicated mount unit, whether the smart webcam device (100) is placed on top of a display screen frame, a vehicle dashboard, a tabletop, an uneven surface, or another device placement location.

Furthermore, in one embodiment of the invention, the smart webcam device (100) with the distributed circuit casings (101, 117) and the cable-encapsulating neck structure (105) uniquely distribute weight of the smart webcam device (100) in multiple segments, so that the bottom housing (101) can be securely be positioned on a flat surface without a need for dedicated mount. Moreover, the balanced weight distribution and multi-segmentization of the smart webcam device (100) also enables the top housing (117) to be securely hung on top of a display screen frame, using the webcam hanger (113). In addition, the swivel-capable bottom housing (101) and the swivel-capable top housing (117) can uniquely pivot around the edges of the cable-encapsulating neck structure (105) to form an inline formation, if the smart webcam device (100) were to be hung on top of a display screen frame.

Continuing with FIG. 1, in a preferred embodiment of the invention, the smart webcam device (100) is a novel webcam device that integrates camera lens-based capturing of multimedia information (i.e. pictures, videos, and etc.), internal processing of multimedia information within the novel webcam device, and cloud network communication capability to transmit the internally-processed multimedia information to another electronic device via a cloud network. Furthermore, in the preferred embodiment of the invention, a smart webcam device (100) is also configured to function as an Internet modem and a general-purpose cloud network-connected computing device for web browsing, if a separate display screen or a television screen is connected to the smart webcam device.

Figure 2:
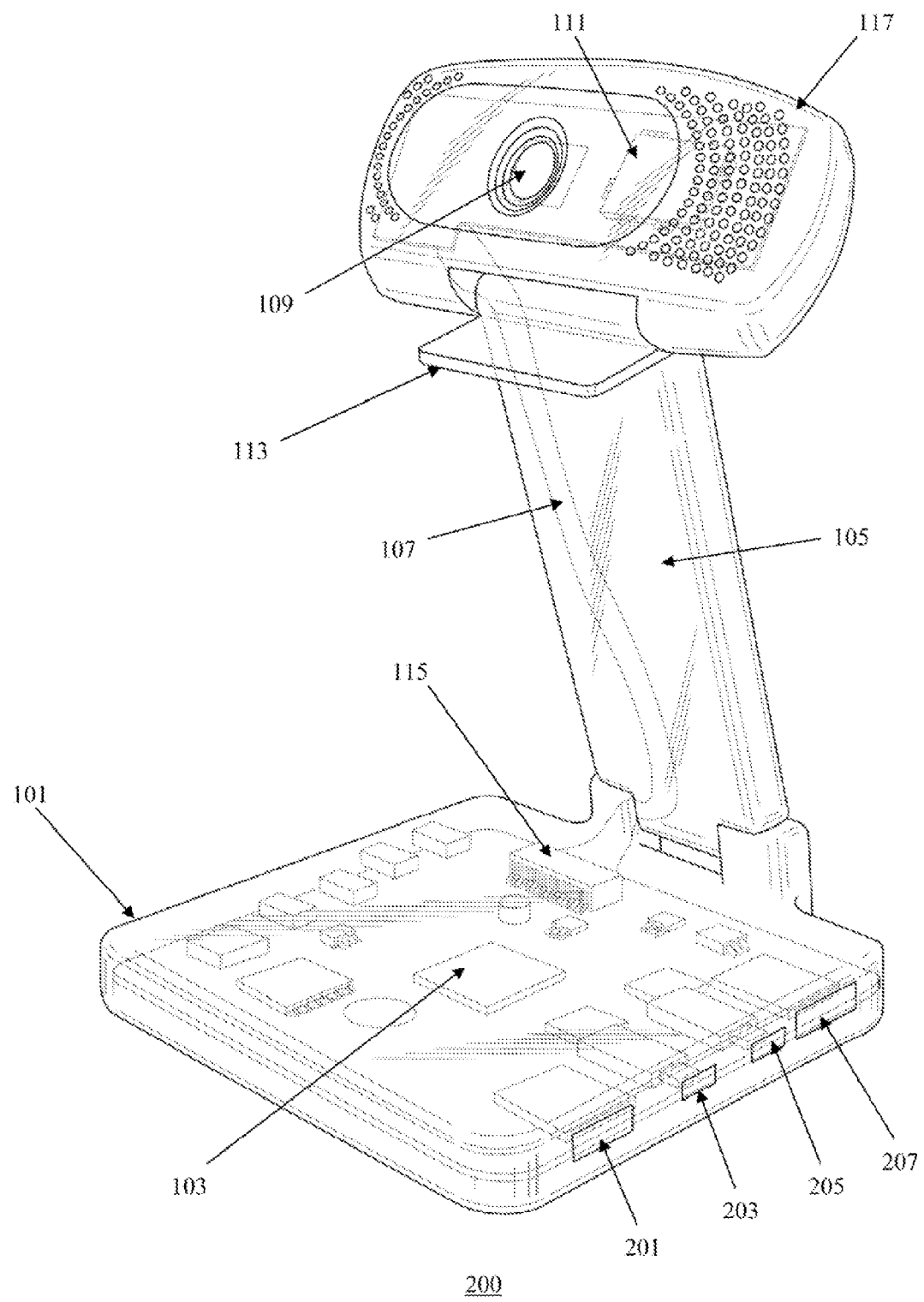
FIG. 2 shows an offset frontal perspective diagram of a smart webcam device in distributed circuit casings and cable-encapsulating neck structure, in accordance with an embodiment of the invention.

FIG. 2 shows an offset frontal perspective diagram of a smart webcam device (200) in distributed circuit casings (101, 117) and a cable-encapsulating neck structure (105), in accordance with an embodiment of the invention. In a preferred embodiment of the invention, the smart webcam device (200) comprises a swivel-capable bottom housing (101) and a swivel-capable top housing (117) that form the distributed circuit casing (101, 117), plus the cable-encapsulating neck structure (105).

In the preferred embodiment of the invention, the swivel-capable bottom housing (101) contains a network communication-capable computing circuitry (103), which comprises a CPU, a memory unit, a camera data interface (115), and an external data communication interface. As shown in FIG. 2, the external data communication interface may be associated with a plurality of data communication ports (201, 203, 205, and 207). In one example, the plurality of data communication ports (201, 203, 205, and 207) comprises one or more USB ports, HDMI ports, wireless antennas, and/or other data input/output ports. In addition, the swivel-capable bottom housing (101) may also contain a local data storage, a graphics unit (e.g. a graphics processor unit, a display driver, and etc.), and a power management unit. Preferably, the power management unit of the swivel-capable bottom housing (101) is operatively connected to a power source, such as a power outlet, a power adapter, and/or a battery unit. Furthermore, in the preferred embodiment of the invention, the swivel-capable top housing (117) contains a webcam-specific circuitry (111), which comprises a camera lens (109), a camera processing unit (e.g. 415 of FIG. 4), and/or a webcam unit interface (e.g. 301 of FIG. 3).

Moreover, as shown in one embodiment of the invention in FIG. 2, the cable-encapsulating neck structure (105) is interposed between the swivel-capable bottom housing (101) and the swivel-capable top housing (117). The cable-encapsulating neck structure (105) is designed to encapsulate a data communication and power cable (107) that connects the camera data interface (115) of the swivel-capable bottom housing (101) and the webcam unit interface (e.g. 301 of FIG. 3) of the swivel-capable top housing (117). In addition, the cable-encapsulating neck structure (105) also includes a webcam hanger (113) that protrudes from a frontal edge of the cable-encapsulating neck structure (105).

In the preferred embodiment of the invention, the distributed placement of the network communication-capable computing circuitry (103) in the bottom housing (101) and the webcam-specific circuitry (111) in the top housing (117) are spaced apart and separated by the cable-encapsulating neck structure (105) in the middle. In another embodiment of the invention, the network communication-capable computing circuitry (103) may instead be placed in a leftmost or rightmost housing, and the webcam-specific circuitry (111) may instead be placed in a rightmost or leftmost housing, with the cable-encapsulating neck structure (105) interposed in the middle of the two housings. Therefore, while the preferred embodiment of the invention shows top-to-bottom vertical segments for the distributed circuit casings, it may be desirable to design an alternate embodiment of the invention to be leftmost-to-rightmost horizontal segments for the distributed circuit casings, if such geometrical configurations are preferable for a specific usage.

Continuing with FIG. 2, in the preferred embodiment of the invention, the three-segment smart webcam device casings are structurally unique over conventional webcam casings and packages. For example, most conventional webcam casings and packages merely contain a webcam-specific circuitry with a camera lens in a "slab" single-piece casing, with a data communication and/or power cable (e.g. 107) externally exposed and freely hanging outside the slab single-piece casing. In conventional webcam casing designs, the freely-hanging data communication and/or power cable is typically exposed externally and is plugged into a computer or another electronic device that can perform multimedia data processing, network communications, and other computing functions. The external exposure of the freely-hanging data communication and/or power cable increases the chances of misconnections, faulty connections, and cable damages for potential malfunction of the webcam devices.

In contrast, the smart webcam device (200) in accordance with an embodiment of the present invention uniquely keeps the data communication and/or power cable (107) fully encased and encapsulated within the three segments (i.e. 101, 105, and 117) of the smart webcam device (200). In various real-life deployment conditions of the smart webcam device (200), the internal encapsulation of the data communication and/or power cable (107) in the cable-encapsulating neck structure (105) substantially improves the operational durability of the smart webcam device (200) by removing exposed cable-related clutter, and also by removing the need for an external cable connection to a main computing unit for multimedia data processing and transmission. Furthermore, the internal encapsulation of the data communication and/or power cable (107) in the cable-encapsulating neck structure (105) and the pivot-capable top and bottom housings (101, 117) enable versatile deployment and application of the smart webcam device (200) without requiring a dedicated mount unit, whether the smart webcam device (200) is placed on top of a display screen frame, a vehicle dashboard, a tabletop, an uneven surface, or another device placement location.

Furthermore, in one embodiment of the invention, the smart webcam device (200) with the distributed circuit casings (101, 117) and the cable-encapsulating neck structure (105) uniquely distribute weight of the smart webcam device (200) in multiple segments, so that the bottom housing (101) can be securely be positioned on a flat surface without a need for dedicated mount. Moreover, the balanced weight distribution and multi-segmentization of the smart webcam device (200) also enables the top housing (117) to be securely hung on top of a display screen frame, using the webcam hanger (113). In addition, the swivel-capable bottom housing (101) and the swivel-capable top housing (117) can uniquely pivot around the edges of the cable-encapsulating neck structure (105) to form an inline formation, if the smart webcam device (200) were to be hung on top of a display screen frame.

Continuing with FIG. 2, in a preferred embodiment of the invention, the smart webcam device (200) is a novel webcam device that integrates camera lens-based capturing of multimedia information (i.e. pictures, videos, and etc.), internal processing of multimedia information within the novel webcam device, and cloud network communication capability to transmit the internally-processed multimedia information to another electronic device via a cloud network. Furthermore, in the preferred embodiment of the invention, a smart webcam device (200) is also configured to function as an Internet modem and a general-purpose cloud network-connected computing device for web browsing, if a separate display screen or a television screen is connected to the smart webcam device.

Figure 3:
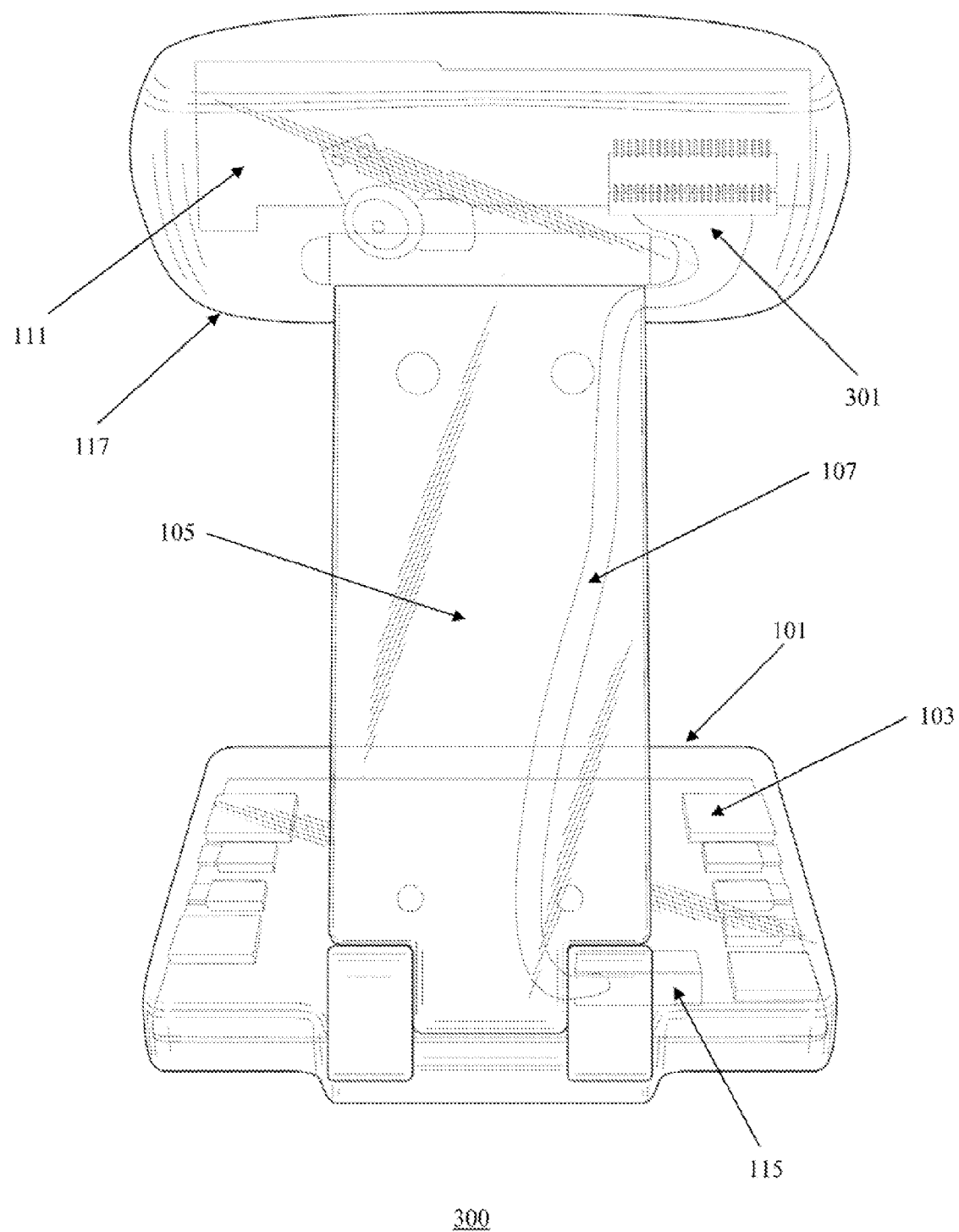
FIG. 3 shows a rear perspective diagram of a smart webcam device in distributed circuit casings and cable-encapsulating neck structure, in accordance with an embodiment of the invention.

FIG. 3 shows a rear perspective diagram of a smart webcam device (300) in distributed circuit casings and cable-encapsulating neck structure, in accordance with an embodiment of the invention. In a preferred embodiment of the invention, the smart webcam device (300) comprises a swivel-capable bottom housing (101) and a swivel-capable top housing (117) that form the distributed circuit casing (101, 117), plus the cable-encapsulating neck structure (105).

In the preferred embodiment of the invention, the swivel-capable bottom housing (101) contains a network communication-capable computing circuitry (103), which comprises a CPU, a memory unit, a camera data interface (115), and an external data communication interface. In addition, the swivel-capable bottom housing (101) may also contain a local data storage, a graphics unit (e.g. a graphics processor unit, a display driver, and etc.), and a power management unit. Preferably, the power management unit of the swivel-capable bottom housing (101) is operatively connected to a power source, such as a power outlet, a power adapter, and/or a battery unit. Furthermore, in the preferred embodiment of the invention, the swivel-capable top housing (117) contains a webcam-specific circuitry (111), which comprises a camera lens (e.g. 109 in FIG. 1), a camera processing unit (e.g. 415 of FIG. 4), and/or a webcam unit interface (301).

In one embodiment of the invention, the webcam unit interface (301) is configured to transmit raw multimedia data (e.g. raw data associated with pictures or videos) captured from the camera lens of the webcam-specific circuitry (111) to the camera data interface (115) in the bottom housing (101) via a data communication and/or power cable (107), which is encapsulated inside the cable-encapsulating neck structure (105). In one embodiment of the invention, the camera data interface (115) then temporarily buffers the raw multimedia data before the CPU and the memory unit of the network communication-capable computing circuitry (103) further processes and transforms the raw multimedia data into processed multimedia data in standardized format. Alternatively, the webcam-specific circuitry (111) may process and transform the raw multimedia data into the processed multimedia data in standardized format with a dedicated camera processing unit, before sending any data to the camera data interface (115) in the network communication-capable computing circuitry (103).

Moreover, as shown in one embodiment of the invention in FIG. 3, the cable-encapsulating neck structure (105) is interposed between the swivel-capable bottom housing (101) and the swivel-capable top housing (117). The cable-encapsulating neck structure (105) is designed to encapsulate a data communication and power cable (107) that connects the camera data interface (115) of the swivel-capable bottom housing (101) and the webcam unit interface (301) of the swivel-capable top housing (117). In addition, the cable-encapsulating neck structure (105) also includes a webcam hanger (e.g. 113 in FIG. 1) that protrudes from a frontal edge of the cable-encapsulating neck structure (105).

In the preferred embodiment of the invention, the distributed placement of the network communication-capable computing circuitry (103) in the bottom housing (101) and the webcam-specific circuitry (111) in the top housing (117) are spaced apart and separated by the cable-encapsulating neck structure (105) in the middle. In another embodiment of the invention, the network communication-capable computing circuitry (103) may instead be placed in a leftmost or rightmost housing, and the webcam-specific circuitry (111) may instead be placed in a rightmost or leftmost housing, with the cable-encapsulating neck structure (105) interposed in the middle of the two housings. Therefore, while the preferred embodiment of the invention shows top-to-bottom vertical segments for the distributed circuit casings, it may be desirable to design an alternate embodiment of the invention to be leftmost-to-rightmost horizontal segments for the distributed circuit casings, if such geometrical configurations are preferable for a specific usage.

Continuing with FIG. 3, in the preferred embodiment of the invention, the three-segment smart webcam device casings are structurally unique over conventional webcam casings and packages. For example, most conventional webcam casings and packages merely contain a webcam-specific circuitry with a camera lens in a "slab" single-piece casing, with a data communication and/or power cable (e.g. 107) externally exposed and freely hanging outside the slab single-piece casing. In conventional webcam casing designs, the freely-hanging data communication and/or power cable is typically exposed externally and is plugged into a computer or another electronic device that can perform multimedia data processing, network communications, and other computing functions. The external exposure of the freely-hanging data communication and/or power cable increases the chances of misconnections, faulty connections, and cable damages for potential malfunction of the webcam devices.

In contrast, the smart webcam device (300) in accordance with an embodiment of the present invention uniquely keeps the data communication and/or power cable (107) fully encased and encapsulated within the three segments (i.e. 101, 105, and 117) of the smart webcam device (300). In various real-life deployment conditions of the smart webcam device (300), the internal encapsulation of the data communication and/or power cable (107) in the cable-encapsulating neck structure (105) substantially improves the operational durability of the smart webcam device (300) by removing exposed cable-related clutter, and also by removing the need for an external cable connection to a main computing unit for multimedia data processing and transmission. Furthermore, the internal encapsulation of the data communication and/or power cable (107) in the cable-encapsulating neck structure (105) and the pivot-capable top and bottom housings (101, 117) enable versatile deployment and application of the smart webcam device (300) without requiring a dedicated mount unit, whether the smart webcam device (300) is placed on top of a display screen frame, a vehicle dashboard, a tabletop, an uneven surface, or another device placement location.

Furthermore, in one embodiment of the invention, the smart webcam device (300) with the distributed circuit casings (101, 117) and the cable-encapsulating neck structure (105) uniquely distribute weight of the smart webcam device (300) in multiple segments, so that the bottom housing (101) can be securely be positioned on a flat surface without a need for dedicated mount. Moreover, the balanced weight distribution and multi-segmentization of the smart webcam device (300) also enables the top housing (117) to be securely hung on top of a display screen frame, using the webcam hanger (e.g. 113 in FIG. 1). In addition, the swivel-capable bottom housing (101) and the swivel-capable top housing (117) can uniquely pivot around the edges of the cable-encapsulating neck structure (105) to form an inline formation, if the smart webcam device (300) were to be hung on top of a display screen frame.

Continuing with FIG. 3, in a preferred embodiment of the invention, the smart webcam device (300) is a novel webcam device that integrates camera lens-based capturing of multimedia information (i.e. pictures, videos, and etc.), internal processing of multimedia information within the novel webcam device, and cloud network communication capability to transmit the internally-processed multimedia information to another electronic device via a cloud network. Furthermore, in the preferred embodiment of the invention, a smart webcam device (300) is also configured to function as an Internet modem and a general-purpose cloud network-connected computing device for web browsing, if a separate display screen or a television screen is connected to the smart webcam device.

Figure 4:
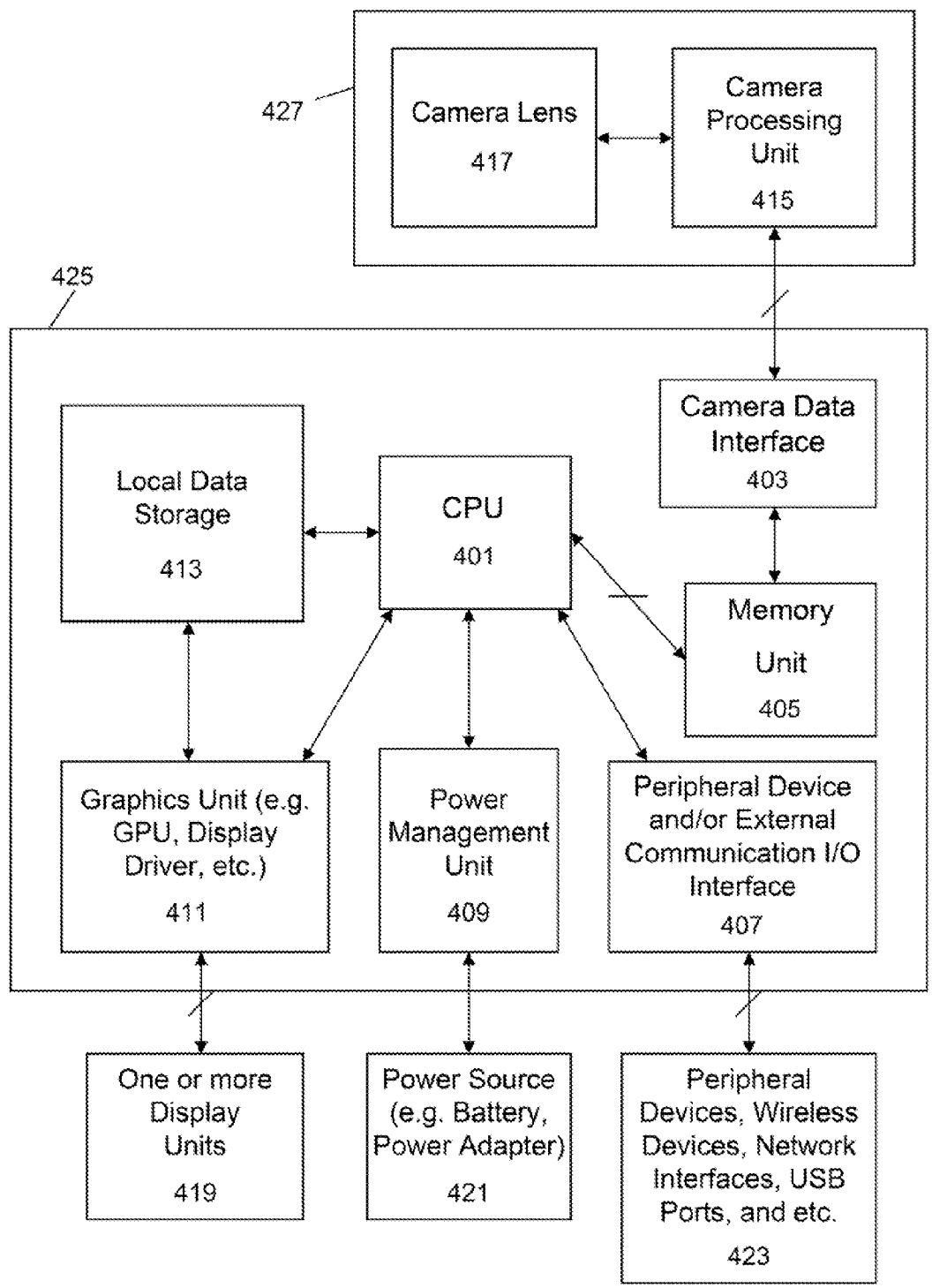
FIG. 4 shows a block diagram of logical units contained in a smart webcam device in distributed circuit casings and cable-encapsulating neck structure, in accordance with an embodiment of the invention.

FIG. 4 shows a block diagram (400) of logical units contained in a smart webcam device in distributed circuit casings (i.e. 425, 427) and cable-encapsulating neck structure, in accordance with an embodiment of the invention. In a preferred embodiment of the invention, the smart webcam device is capable of capturing raw multimedia data via a camera lens, processing and transforming the raw multimedia data into a standardized multimedia data set, and transmitting the standardized data set to a cloud network using a wireless transceiver or a wired network modem embedded in the smart webcam device.

As shown in FIG. 4, in one embodiment of the invention, a network communication-capable computing circuitry (425) comprises a CPU (401), a camera data interface (403), a memory unit (405), a peripheral device and/or external communication input/output interface (407), a power management unit (409), a graphics unit (411), and a local data storage (413). At a minimum, the network communication-capable computing circuitry (425) in a first housing (e.g. a bottom housing) is configured to transmit multimedia data received from the camera data interface (403) to another electronic device via a data network, which may be a wireless data network, a wired data network, or a combination of the two networks.

Preferably, the network communication-capable computing circuitry (425) also performs more tasks than the data transmission function alone. For example, the network communication-capable computing circuitry (425) can first receive raw multimedia data captured from a camera lens (417) and a camera processing unit (415) of a webcam-specific circuitry (427) in a second housing (e.g. a top housing). In one embodiment of the invention, the camera processing unit (415) is capable to activating or deactivating the camera lens (417) based on commands received from the CPU (401) in the network communication-capable computing circuitry (425). The camera processing unit (415) may also supply electrical power to the camera lens (417). The camera processing unit (415) may also provide some level of preliminary processing of raw multimedia data captured from the camera lens (417). Examples of preliminary processing of raw multimedia data include image noise filtering, noise suppression, and other beneficial real-time adjustments. The network communication-capable computing circuitry (425) and its CPU (401) can then further process and transform the raw multimedia data into processed multimedia data in a standardized format, such as JPEG or MPEG.

Furthermore, the data communication between the first housing that contains the network communication-capable computing circuitry (425) and the second housing that contains the webcam-specific circuitry (427) is provided by a data communication and power cable (e.g. 107 of FIG. 1), which is encased inside a cable-encapsulating neck structure (e.g. 105 of FIG. 1) interposed between the first housing and the second housing for the smart webcam device. The complete encapsulation of the data communication and power cable (e.g. 107 of FIG. 1) without any freely-hanging exposed portion of data cables between the first housing and the second housing is made possible by utilizing the cable-encapsulating neck structure (e.g. 105 of FIG. 1) that embodies a very unique and novel multi-segment casing design for a smart webcam device, in accordance with one or more embodiments of the invention.

Continuing with FIG. 4, in one embodiment of the invention, the network communication-capable computing circuitry (425) contains a plurality of logical units, such as the CPU (401), the camera data interface (403), the memory unit (405), the peripheral device and/or external communication I/O interface (407), the power management unit (409), the graphics unit (411), and the local data storage (413). These logical units may be placed on a single printed circuit board in one embodiment of the invention, or on a plurality of printed circuit boards in another embodiment of the invention.

Furthermore, in a preferred embodiment of the invention, the CPU (401) is configured to control each logical unit operatively (i.e. directly or indirectly) connected to the CPU (401). The memory unit (405) typically comprises volatile memory banks based on DRAM's. In some embodiments of the invention, the memory unit (405) may use non-volatile memory technologies such as SRAM's and/or Flash memory. The memory unit (405) is capable of storing or uploading programs and applications which can be executed by the CPU (401), the graphics unit (411), or another logical unit operatively connected to the memory unit (405). In one or more embodiments of the invention, software components that provide data transformations and conversions from raw multimedia data to processed multimedia data in a standardized format, for example, may be stored in the local data storage (413), and then can be executed on the CPU (401) and the memory unit (405) of the smart webcam device as needed.

In addition, as shown in FIG. 4, the peripheral device and/or external communication I/O interface (407) may be operatively connected to a wireless transceiver and an radio frequency (RF) antenna for wireless data access via a cloud network. The peripheral device and/or external communication I/O interface (407) can also be operatively connected to a plurality of electronic devices via a data network and/or a direct device-to-device connection method. Moreover, the power management unit (409) is operatively connected to a power supply unit and a power source (e.g. battery, power adapter) (421), and the power management unit (409) generally controls power supplied to various logical units in the smart webcam device. Furthermore, in one embodiment of the invention, the graphics unit (411) in the system block diagram (400) comprises a graphics processor, a display driver, a dedicated graphics memory unit, and/or another graphics-related logical components. In general, the graphics unit (411) is able to process and communicate graphics-related data with the CPU (401), the display driver, and/or the dedicated graphics memory unit. The graphics unit (411) is also operatively connected to one or more display units (419).

Various embodiments of the present invention provide several advantages over conventional webcam packages. For example, a novel webcam device in distributed circuit casings and a cable-encapsulating neck structure in accordance with an embodiment of the present invention provides balanced weight distributions in multiple segments of the distributed circuit casings and cable-encapsulating neck structure, so that the novel webcam device can be deployed in a variety of different environments without requiring separate installation mounts. The novel webcam device in accordance with an embodiment of the present invention, for example, can be placed on top of a display screen frame with an integrated webcam hanger, on a tabletop using a swivel-capable bottom housing, or on a vehicle's dashboard using the swivel-capable bottom housing without separate installation mounts. In addition, by providing separate housings for a webcam-specific circuitry and a network communication-capable computing circuitry, wherein the separate housings are interposed by a novel cable-encapsulating neck structure, the balanced weight distribution for a smart webcam device is optimized without adding unnecessary extra weight to the casings. Furthermore, by uniquely embedding data and power interconnect cables inside the cable-encapsulating neck structure, which is interposed between the webcam-specific circuitry and the network communication-capable computing circuitry, various embodiments of the present invention can reduce freely-hanging cable clutter and can improve operational durability of the novel webcam device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A smart webcam device in distributed circuit casings, the smart webcam device comprising:
    a swivel-capable bottom housing that includes a network communication-capable computing circuitry, wherein the network communication-capable computing circuitry comprises a central processing unit (CPU), a memory unit, a camera data interface, and an external data communication interface;
    a swivel-capable top housing that includes a webcam-specific circuitry, wherein the webcam-specific circuitry comprises a camera lens, a camera processing unit, and a webcam unit interface; and
    a cable-encapsulating neck structure interposed between the swivel-capable bottom housing and the swivel-capable top housing, wherein the cable-encapsulating neck structure encapsulates a data communication and power cable that connects the camera data interface of the swivel-capable bottom housing and the webcam unit interface of the swivel-capable top housing, and wherein the cable-encapsulating neck structure also includes a webcam hanger that protrudes from an edge of the cable-encapsulating neck structure.

2. The smart webcam device of claim 1, further comprising a power management unit and a power source operatively connected to the CPU and the memory unit of the network communication-capable computing circuitry.

3. The smart webcam device of claim 1, further comprising a local data storage, a graphics unit, and a display unit, which are operatively connected to the CPU and the memory unit of the network communication-capable computing circuitry.

4. The smart webcam device of claim 1, further comprising one or more USB ports and other multimedia communication ports, which are operatively connected to the CPU and the memory unit of the network communication-capable computing circuitry.

5. The smart webcam device of claim 1, wherein the external data communication interface is a wireless transceiver for transmitting data to or receiving data from a wireless data network.

6. The smart webcam device of claim 1, wherein the external data communication interface is a wired data communication interface for transmitting data to or receiving data from a wired data network.

7. The smart webcam device of claim 1, wherein the camera data interface is operatively connected to the CPU and the memory unit of the swivel-capable bottom housing, and is also operatively connected to the webcam unit interface, the camera processing unit, and the camera lens of the top housing for relaying multimedia data, which is initially captured from the camera lens in the swivel-capable top housing, to the CPU and the memory unit in the swivel-capable bottom housing.

8. The smart webcam device of claim 1, wherein the camera processing unit, the CPU, and the memory unit transform raw multimedia data captured from the camera lens into processed multimedia data in a standardized format before transmitting the processed multimedia data in the standardized format to another electronic device operatively connected to a data network.

9. The smart webcam device of claim 1, wherein the cable-encapsulating neck structure is vertically-elongated to enable the webcam hanger to be positioned on top of a display screen frame.

10. The smart webcam device of claim 1, wherein the swivel-capable bottom housing forms a stationary base on a flat surface with multiple angle adjustments for the camera lens.

11. The smart webcam device of claim 1, wherein the swivel-capable bottom housing and the swivel-capable top housing pivot around a horizontal edge or a vertical edge of the cable-encapsulating neck structure for angular adjustment of the camera lens in the swivel-capable top housing.

12. A smart webcam device in distributed circuit casings, the smart webcam device comprising:
    a swivel-capable first housing that includes a network communication-capable computing circuitry, wherein the network communication-capable computing circuitry comprises a central processing unit (CPU), a memory unit, a camera data interface, and an external data communication interface;
    a swivel-capable second housing that includes a webcam-specific circuitry, wherein the webcam-specific circuitry comprises a camera lens, a camera processing unit, and a webcam unit interface; and a cable-encapsulating neck structure interposed between the swivel-capable first housing and the swivel-capable second housing, wherein the cable- encapsulating neck structure encapsulates a data communication and power cable that connects the camera data interface of the swivel-capable first housing and the webcam unit interface of the swivel-capable second housing, and wherein the cable-encapsulating neck structure also includes a webcam hanger that protrudes from an edge of the cable-encapsulating neck structure.

13. The smart webcam device of claim 12, further comprising a power management unit and a power source operatively connected to the CPU and the memory unit of the network communication-capable computing circuitry.

14. The smart webcam device of claim 12, further comprising a local data storage, a graphics unit, and a display unit, which are operatively connected to the CPU and the memory unit of the network communication-capable computing circuitry.

15. The smart webcam device of claim 12, further comprising one or more USB ports and other multimedia communication ports, which are operatively connected to the CPU and the memory unit of the network communication-capable computing circuitry.

16. The smart webcam device of claim 12, wherein the external data communication interface is a wireless transceiver for transmitting data to or receiving data from a wireless data network.

17. The smart webcam device of claim 12, wherein the external data communication interface is a wired data communication interface for transmitting data to or receiving data from a wired data network.

18. The smart webcam device of claim 12, wherein the camera data interface is operatively connected to the CPU and the memory unit of the swivel-capable first housing, and is also operatively connected to the webcam unit interface, the camera processing unit, and the camera lens of the second housing for relaying multimedia data, which is initially captured from the camera lens in the swivel-capable second housing, to the CPU and the memory unit in the swivel-capable first housing.

19. The smart webcam device of claim 12, wherein the camera processing unit, the CPU, and the memory unit transform raw multimedia data captured from the camera lens into processed multimedia data in a standardized format before transmitting the processed multimedia data in the standardized format to another electronic device operatively connected to a data network.

20. The smart webcam device of claim 12, wherein the cable-encapsulating neck structure is vertically-elongated to enable the webcam hanger to be positioned on top of a display screen frame.

* * * * *